United States Patent
Chang

(10) Patent No.: US 10,044,916 B2
(45) Date of Patent: Aug. 7, 2018

(54) IMAGE PICKUP MODULE AND THE MANUFACTURING METHOD THEREOF

(71) Applicant: ALTEK CORPORATION, Hsinchu (TW)

(72) Inventor: Jui-Hsin Chang, Miaoli County (TW)

(73) Assignee: ALTEK CORPORATION, Hsinchu (TW)

( * ) Notice: Subject to any disclaimer, the term of this patent is extended or adjusted under 35 U.S.C. 154(b) by 0 days.

(21) Appl. No.: 15/180,100

(22) Filed: Jun. 13, 2016

(65) Prior Publication Data
US 2016/0366313 A1    Dec. 15, 2016

(30) Foreign Application Priority Data

Jun. 11, 2015  (TW) .............................. 104209349 A

(51) Int. Cl.
H04N 5/225  (2006.01)
H04N 5/247  (2006.01)

(52) U.S. Cl.
CPC ......... *H04N 5/2252* (2013.01); *H04N 5/2251* (2013.01); *H04N 5/2254* (2013.01); *H04N 5/2257* (2013.01); *H04N 5/2258* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 2006/0077786 A1* | 4/2006 | Hendriks | .................. | G11B 7/22 369/44.23 |
| 2009/0040361 A1* | 2/2009 | Heim | ....................... | G03B 5/00 348/340 |
| 2011/0199530 A1* | 8/2011 | Kosaka | .................... | G02B 7/02 348/340 |
| 2012/0086784 A1* | 4/2012 | Oh | ........................ | H04N 5/2251 348/47 |
| 2013/0298381 A1* | 11/2013 | Owen | ................... | F16L 3/2332 29/525.01 |

* cited by examiner

*Primary Examiner* — Mark T Monk
(74) *Attorney, Agent, or Firm* — JCIPRNET

(57) ABSTRACT

An image pickup module includes a frame, two or more than two image pickup devices including electric circuit board and plural affixing gel layers. The frame includes two or more than two image pickup openings, and each of the image pickup devices is disposed in one of the image pickup openings. Each of the image pickup devices is adhered to an inner edge of one of the image pickup openings through one of the affixing gel layers, so as to affix the image pickup devices to the frame. A manufacture method of an image pickup module is also provided.

20 Claims, 4 Drawing Sheets

IMAGE PICKUP MODULE AND THE MANUFACTURING METHOD THEREOF

CROSS-REFERENCE TO RELATED APPLICATION

This application claims the priority benefit of Taiwan application serial no. 104209349, filed on Jun. 11, 2015. The entirety of the above-mentioned patent application is hereby incorporated by reference herein and made a part of this specification.

BACKGROUND OF THE INVENTION

1. Field of the Invention

The present invention generally relates to an image pickup module and the manufacturing method thereof, in particular, to an image pickup module including two or more image pickup devices and the manufacturing method of the image pickup module.

2. Description of Related Art

Due to the progress of technology development, more and more electronic products have characteristics of multiple functions, miniature and highly sophisticated. In our lives, film making and photography function have already been indispensable functions of electronic devices, such as camera systems, mobile devices, medical observation devices. In order to acquire a better image quality and image effect, the electronic devices will be installed with camera module having multiple camera units or photography units, so as to provide a wide variety of camera function.

However, in the technique nowadays, the camera units and the photography units need to be fixed to the camera module before connection to the other units in the electronic devices, and the camera units and the photography units of the camera module need to be tested individually after connection, so as to achieve the best camera effect. In the testing process, any offset or malfunctions of the camera units or the photography units will cause the loss of the required function of the entire camera module, and replacement and obsolescence of the entire camera module will be needed, and the cost of manufacturing the electronic devices will be increased.

SUMMARY OF THE INVENTION

Accordingly, the present invention is directed to an image pickup module able to properly affix a plurality of image pickup device.

An embodiment of the invention provides an image pickup module including a frame, image pickup devices, and affixing gel layers. The frame includes image pickup openings and at least a bottom opening locating below the image pickup openings. Each of the image pickup devices is disposed in the frame, and capturing images through each of the image pickup openings respectively, and including side surface and circuit board extending outwardly through the bottom opening. Gel filling spaces are formed between inner edges of the image pickup openings and side surfaces of one of the image pickup devices. Each of the affixing gel layers is disposed in one of the gel filling spaces. Each of the image pickup devices is adhered to one of the affixing gel layer, and each of the image pickup openings of the frame surrounds the side surface of each of the image pickup devices.

In one embodiment of the invention, the frame further includes a light incident surface, and the image pickup openings are located on the light incident surface.

In one embodiment of the invention, area of each of the image pickup openings is larger than the projection area on the light incident surface of the image pickup device inside.

In one embodiment of the invention, each of the image pickup devices further includes a lens and an actuator surrounding the lens. Side surface of the actuator of each of the image pickup devices and the inner edges of the image pickup openings are adhered to each other by the affixing gel layers, and part of the lens and the actuator of each of the image pickup devices are exposed by one of the image pickup openings.

In one embodiment of the invention, each of the image pickup openings includes a size enough for each corresponding one of the image pickup devices to pass through it.

In one embodiment of the invention, the frame further includes lens through holes and at least one supporting part connecting the lens through holes, and each of the lens through holes includes each of the image pickup openings, and the supporting part maintains a gap between the lens through holes.

An embodiment of the invention provides an image pickup module including, a frame, image pickup devices and affixing gel layers. The frame includes lens through holes, light incident side and connection side being corresponded to the light incident side, and the lens through holes extend from the light incident side to the connection side and form image pickup openings on the light incident side. Each of the image pickup devices includes a lens and a side surface surrounding the lens. Each of the image pickup devices is disposed in one of the lens through holes. One of the affixing gel layers adhere the side surface of the lens through hole of the frame and the side surface of the image pickup device, and the lens and the side surface of every image pickup devices are exposed by one of the image pickup openings.

In one embodiment of the invention, the frame further includes a light incident surface locating on the light incident side. The image pickup openings are located on the light incident surface, and the lens through holes extend from the light incident surface.

In one embodiment of the invention, the area of each of the image pickup openings is larger than the projection area on the light incident surface of the image pickup device inside.

In one embodiment of the invention, the cross-sectional area, being parallel to the light incident surface, of each of the lens through holes is larger than the projection area on the light incident surface of the image pickup device inside.

In one embodiment of the invention, gel filling spaces are form between the inner edge of the image pickup openings and side surface of the image pickup devices, and each of the affixing gel layers is filled in one of the gel filling spaces.

In one embodiment of the invention, each of the image pickup devices further includes an actuator accommodating the lens. The side surface is located on the actuator, and the actuator of each of the image pickup devices is exposed by one of the image pickup openings.

In one embodiment of the invention, each of the image pickup devices further includes an electric circuit board, and the electric circuit board extends outwardly from the connection side of the frame.

In one embodiment of the invention, sizes of the image pickup openings are adapted to allow the side surfaces of the image pickup devices inside to pass through.

In one embodiment of the invention, each of the image pickup openings surrounds the side surface of the image pickup device inside.

In one embodiment of the invention, the frame further includes at least a supporting part connecting the lens through holes. The supporting part maintains a gap between the lens through holes.

An embodiment of the invention provides a manufacturing method of an image pickup module. The manufacturing method includes: providing a frame including lens through holes, light incident side, connection side and image pickup openings; disposing image pickup devices in the frame, wherein each of the image pickup devices comprises a lens and a side surface surrounding the lens and being disposed in one of the lens through holes; and injecting a plurality of affixing gel layer through the image pickup openings, so as to affix each of the side surface of the image pickup devices to one of the edge of the image pickup openings and affix the image pickup devices, and each of the image pickup openings exposes the lens and the side surface of the image pickup device inside, and the lens through holes extends from the light incident side to the connection side and form the image pickup openings on the light incident side.

In one embodiment of the invention, the frame further includes rotating the image pickup devices inside the lens through holes before injecting the affixing gel layers through the image pickup openings.

In one embodiment of the invention, the frame includes adjusting angle of optical axes of the image pickup devices before injecting the affixing gel layers through the image pickup openings.

In one embodiment of the invention, a plurality of gel filling space are form between the edges of the image pickup openings and the side surfaces of the image pickup devices while disposing the image pickup devices in the frame, and the affixing gel layers are filled in the gel filling spaces through the image pickup openings.

In view of the above, in the embodiment of the invention, the image pickup module affixes a plurality of image pickup device through a plurality of image pickup opening of frame, and the image pickup devices are able to be calibrate in the frame before affixing by the affixing gel layers, so as to properly affix the image pickup devices of the image pickup module. In the embodiment of the invention, the manufacturing method of the image pickup module injects affixing gel layers after disposing image pickup devices in the frame, so as to manufacture an image pickup module with calibrated image pickup devices.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
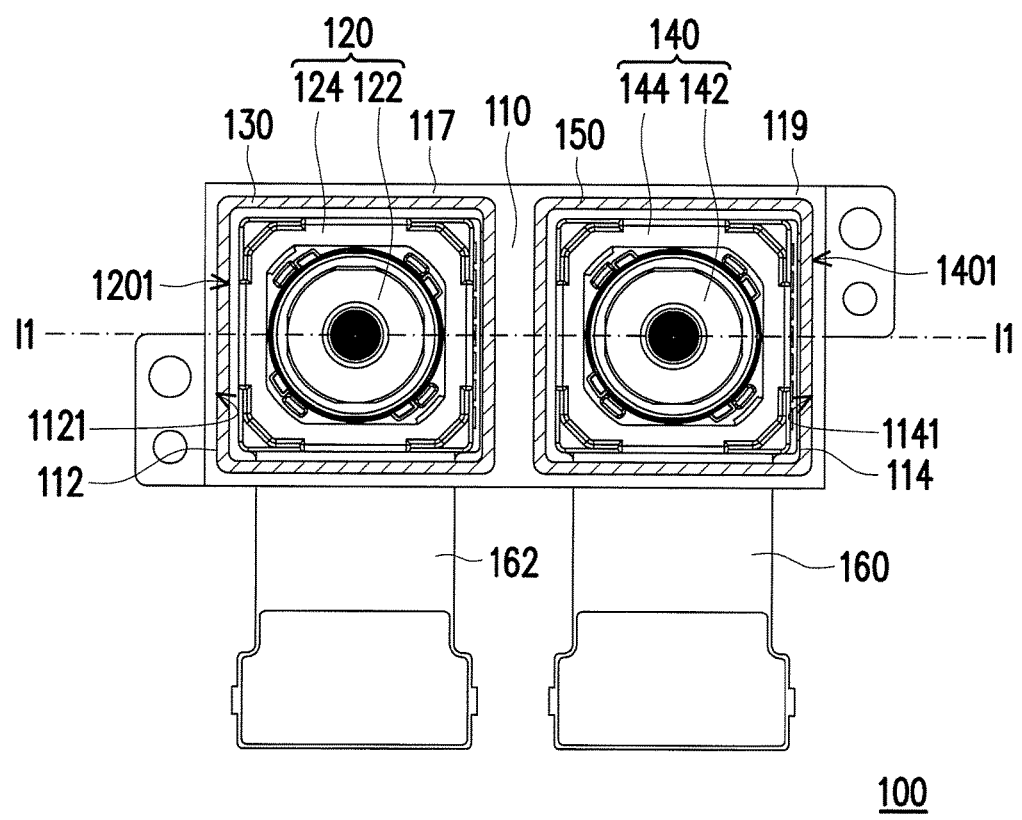
FIG. 1A is a front elevation view of an image pickup module of the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a front elevation view of an image pickup module of the first embodiment of the present invention. Please refer to FIG. 1A, in the first embodiment of the invention, the image pickup module 100 includes frame 110, image pickup devices 120, 140 and affixing gel layers 130, 150. The frame 110 includes image pickup openings 112, 114. The affixing gel layer 130 adheres the image pickup device 120 to the inner edge 1121 of the image pickup opening 112, so as to affix the image pickup device 120 to the frame 110. The affixing gel layer 150 adheres the image pickup device 140 to the inner edge 1141 of the image pickup opening 114, so as to affix the image pickup device 140 to the frame 110.

That is to say, the image pickup devices 120, 140 are respectively affixed to the inner edges 1121, 1141 of the image pickup openings 112, 114 through the affixing gel layers 130, 150, so as to affix the image pickup devices 120, 140 inside the frame 110. Since the image pickup devices 120, 140 of the embodiment are not directly affix by the inner surface of the frame 110 but adhered to the frame 110 through the affixing gel layers 130, 150, angle and position of the image pickup devices 120, 140 can still be calibrate after disposing the image pickup devices 120, 140 in the frame 110. After calibration, the image pickup devices 120, 140 can be affixed by the affixing gel layers 130, 150 made of light-activated resins such as ultraviolet curing resin.

Therefore, the image pickup module 100 of the embodiment can properly affix these two image pickup devices 120, 140, and calibration before affixing can further improve the yield of the image pickup module 100. On the other hand, the frame 110 is a solid frame 110 made of material such as metal or non-metal, so the image module 100 of the embodiment can properly protect the image pickup devices 120, 140.

Figure 1B:
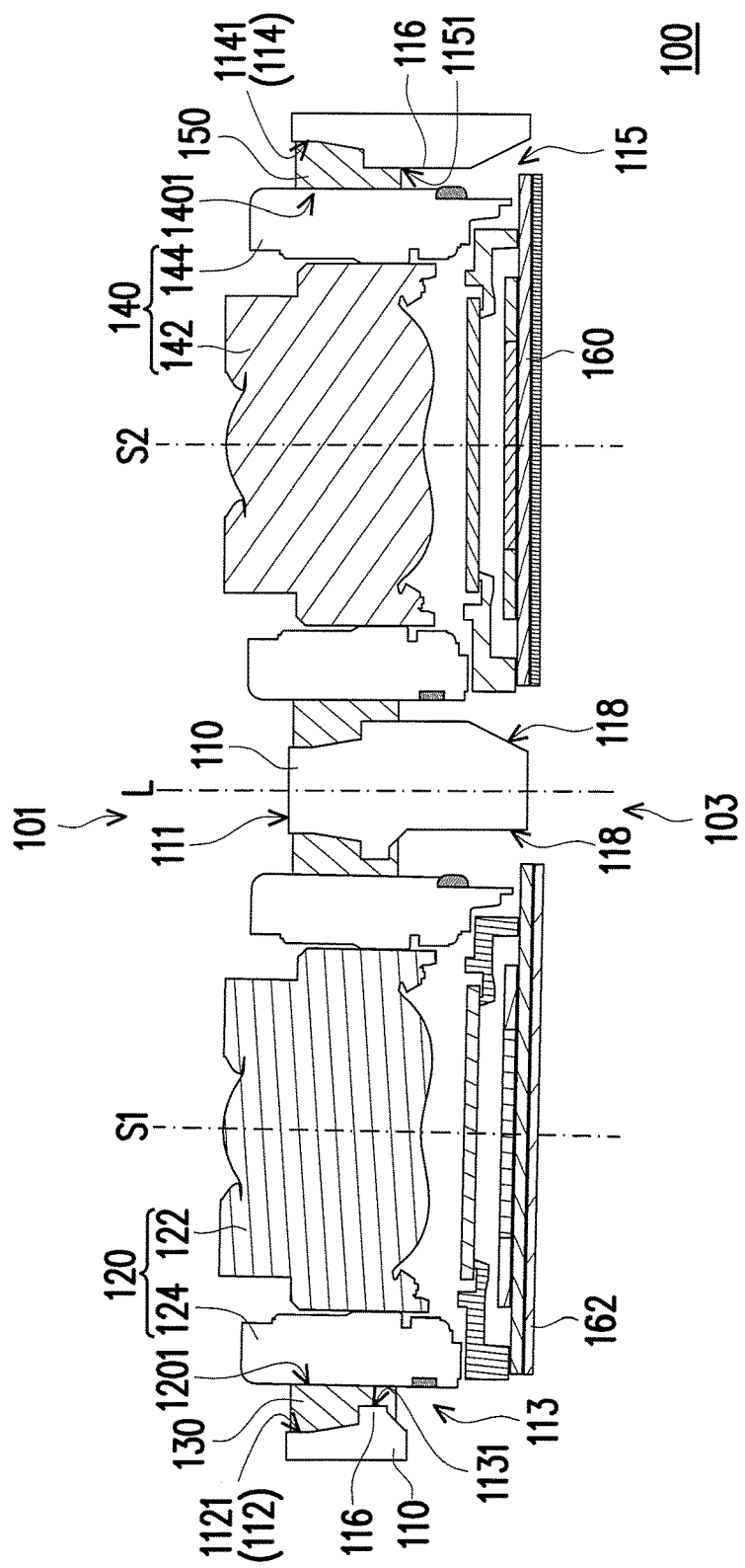
FIG. 1B is a cross-sectional view according line I1I1 in FIG. 1A.

FIG. 1B is a cross-sectional view according line I1I1 in FIG. 1A. Please refer to FIGS. 1A and 1B, in other words, the frame 110 of the image pickup module 100 of the embodiment includes a bottom opening 118 locating below the image pickup openings 112, 114. The image pickup devices 120, 140 are disposed in the frame 110, and the inner edge 1121 of the image pickup opening 112 and the side surface 1201 of the image pickup device 120 form gel loading space in-between, and the affixing gel layer 130 is disposed inside the gel loading space. The inner edge 1141 of the image pickup opening 114 and the side surface 1401 of the image pickup device 140 form gel loading space in-between, and the affixing gel layer 150 is disposed inside the gel loading space. The image pickup device 120 includes electric circuit board 162, and the image pickup device 140 includes electric circuit board 160, and the electric circuit boards 162, 160 extend outwardly through the bottom opening 118, and the image pickup devices 120, 140 capture outside images through the image pickup opening 112, 114 and stick to the affixing gel layers 130, 150.

In other words, referring to FIG. 1B, frame 110 of the image pickup module 100 of the embodiment includes lens through holes 113, 115, light incident side 101 and connection side 103. The lens through hole 113 extends from the connection side 103 to the light incident side 101 and form the image pickup opening 112 on the light incident side 101, and the lens through hole 115 extends from the connection side 103 to the light incident side 101 and form the image pickup opening 114 on the light incident side 101. The image pickup device 120 includes lens 122 and side surface 1201 surrounding the lens 122, and the image pickup device 140 includes lens 142 and side surface 1401 surrounding the lens 142. The image pickup device 120 is disposed inside the lens through hole 113, and the affixing gel layer 130 affixes the edge 1121 of the image pickup opening 112 to the side surface 1201 of the image pickup device 120. The image pickup device 140 is disposed inside the lens through hole 115, and the affixing gel layer 150 affixes the edge 1141 of the image pickup opening 114 to the side surface 1401 of the image pickup device 140. The lens 122 and the side surface 1201 of the image pickup device 120 are exposed by the image pickup opening 112, and the lens 142 and the side surface 1401 of the image pickup device 140 are exposed by the image pickup opening 114.

In other words, manufacturing method of the image pickup module 100 of the embodiment includes: providing a frame 110 including image pickup openings 112, 114; disposing image pickup devices 120, 140 in the frame 110, wherein the image pickup device 120 is disposed in image pickup opening 112, and the image pickup device 140 is disposed in image pickup opening 114; and affixing the image pickup devices 120, 140 to the frame 110 through affixing gel layers 130, 150, wherein the affixing gel layers 130, 150 are injected through the image pickup openings 112, 114. Therefore, the position and the angle of the image pickup devices 120, 140 inside the frame 110 can still be calibrate before affixing by the affixing gel layers 130, 150, so as to improve the accuracy and the efficiency of manufacturing the image pickup module 100 of the embodiment.

In detail, the image pickup devices 120, 140 of the embodiment are, for example, photography unit, lens unit or film recording unit photographing the image outside through these image pickup openings 112, 114. The frame 110 includes light incident surface 111, and the image pickup openings 112, 114 are formed on the light incident surface 111. Therefore, the image pickup devices 120, 140 of the embodiment are able to be individually calibrated before affixing by the affixing gel layers 130, 150, so as to capture good image from outside through the light incident surface 111 by the image pickup devices 120, 140.

To be more specific, the image pickup device 120 includes lens 122 and actuator 124 surrounding the lens 122, the image pickup device 140 include lens 142 and actuator 144 surrounding the lens 142. The side surface 1201 of the image pickup device 120 is located on the actuator 124, and the side surface 1401 of the image pickup device 140 is located on the actuator 144, and the image pickup opening 112 exposes the lens 122 and the actuator 124 of the image pickup device 120, and the image pickup opening 114 exposes the lens 142 and the actuator 144 of the image pickup device 140.

In other words, the lens through holes 113, 115 form image pickup openings 112, 114 on the light incident surface 111, and the lens through holes 113, 115 are extended from the light incident surface 111 and toward the connection side 103.

In detail, please refer to FIG. 1A and FIG. 1B, in the first embodiment of the present invention, the inner surface 1131 of the lens through hole 113 is connected to the image pickup opening 112, and the inner surface 1151 of the lens through hole 115 is connected to the image pickup opening 114. The image pickup device 120 is disposed in the lens through hole 113, and the image pickup device 140 is disposed in the lens through hole 115, and the lens through holes 113, 115 are adapted to let the image pickup devices 120, 140 rotate therein, so as to provide a preserved area for the calibration of image pickup devices 120, 140. Affixing gel layer 130 is further disposed between the side surface 1201 of the image pickup device 120 and the inner surface 1131 of the lens through hole 113, and the affixing gel layer 150 is further disposed between the side surface 1401 of the image pickup device 140 and the inner surface 1151 of the lens through hole 115. Therefore, affixing gel layers 130, 150 respectively affix the location of the image pickup devices 120, 140 in the frame 110, so as to provide a good photography function with the image pickup module 100.

In the image pickup module 100 of the embodiment, the area of the image pickup opening 112 is larger than the projection area of the image pickup device 120 on the light incident surface 111, and the area of the image pickup opening 114 is larger than the projection area of the image pickup device 140 on the light incident surface 111. Therefore, angle and position of the image pickup devices 120, 140 can be calibrated inside the image pickup openings 112, 114, and the inner edge of the image pickup openings 112, 114 and the side surfaces 1201, 1401 of the image pickup devices 120, 140 can form good gel loading spaces.

To be more specific, every cross-sectional area of the lens through hole 113, being parallel to the light incident surface 111, is larger than the projection area of the image pickup device 120 on the light incident surface 111, and every cross-sectional area of the lens through hole 115, being parallel to the light incident surface 111, is larger than the projection area of the image pickup device 140 on the light incident surface 111. Therefore, the frame 110 can allow the image pickup devices 120, 140 to calibrate its angle and position inside, and the inner edge of the image pickup openings 112, 114 and the side surfaces 1201, 1401 of the image pickup devices 120, 140 can form good gel loading spaces.

In other word, the manufacturing method of the image module 100 of the embodiment further includes rotating the image pickup devices 120, 140 in the lens through holes 113, 115 before affixing the image pickup devices 120, 140 in the frame 110. Therefore, the angle of the image pickup devices 120, 140 in the frame 110 can be properly calibrated.

In the embodiment, the image pickup opening 112 surrounds the side surface 1201 of the image pickup device 120, and the image pickup opening 114 surrounds the side surface 1401 of the image pickup device 140. The frame 110 form a side frame surrounding the image pickup device 120 and a side frame surrounding the image pickup device 140. To be more specific, the area of the image pickup opening 112 allows the side surface 1201 of the image pickup device 120 to pass through, the area of the image pickup opening 114 allows the side surface 1401 of the image pickup device 140 to pass through.

On the other side, the affixing gel layers 130, 150 are also able to form angle between the light axis S1 of the image pickup device 120 or the light axis S2 of the image pickup device 140 and the normal L of the light incident surface 111. That is to say, affixing gel layers 130, 150 are able to affix the position and the angle of the image pickup devices 120, 140 in the frame 110, so as to calibrate the angle and the position of the optical axis S1, S2, and the inaccuracy of the image pickup devices 120, 140 can be compensate at the same time, so as to provide a good photography function with the image pickup module 100.

In other words, during the manufacturing process of the image module 100 of the embodiment, the angle between the optical axis S1 of the image pickup device 120 and the normal L of the light incident surface 111 can be adjusted before affixing the image pickup device 120 to the frame 110, and the angle between the optical axis S2 of the image pickup device 140 and the normal L of the light incident surface 111 can be adjusted before affixing the image pickup device 140 to the frame 110.

The affixing gel layers 130, 150 of the embodiment are made of light-activated resins such as ultraviolet curing resin. Therefore, the affixing gel layers 130, 150 can be cured by exposing under light such as ultraviolet after being injected through the image pickup openings 112, 114, so as to affix the image pickup devices 120, 140 in the frame 110.

Moreover, the frame 110 of the embodiment further includes protruding structures 116, and the protruding structures 116 are disposed on the inner surfaces 1131, 1151 of the lens through holes 113, 115, so as to increase the contacting surfaces between the affixing gel layers 130, 150 and inner surfaces 1131, 1151 of lens through holes 113, 115, so as to enforce the fixation of the image pickup devices 120, 140 in the frame 110.

In the embodiment, the image pickup module 100 further includes electric circuit boards 160, 162, and the frame 110 include a bottom opening 118 corresponding to the image pickup openings 112, 114. The image pickup device 120 is disposed on the electric circuit board 162, and the image pickup device 140 is disposed on the electric circuit board 160, and the electric circuit boards 160, 162 extend toward the outside of the frame 110 through the bottom opening 118. In other words, the image pickup openings 112, 114 of the frame 110 being configured to affix the image pickup devices 120, 140 expose the light receiving sides of the image pickup devices 120, 140, and the bottom opening 118 of the frame 110 is able to let the electric circuit boards 160, 162 connect with the electronic device outside the frame 110. Therefore, the frame 110 of the embodiment not only provide affixing function and protection function for the image pickup devices 120, 140, but also provide a convenient connection between image pickup devices 120, 140 and the other devices, so as to improve the assemble efficiency of the image module 100.

Please refer to FIG. 1A, in the first embodiment of the invention, the frame 110 includes an accommodation part 117 having the image pickup opening 112 and the accommodation part 119 having the image pickup opening 114, and the accommodation part 117 and the accommodation part 119 are adjacent to each other, but the invention is not limit thereto.

Figure 2A:
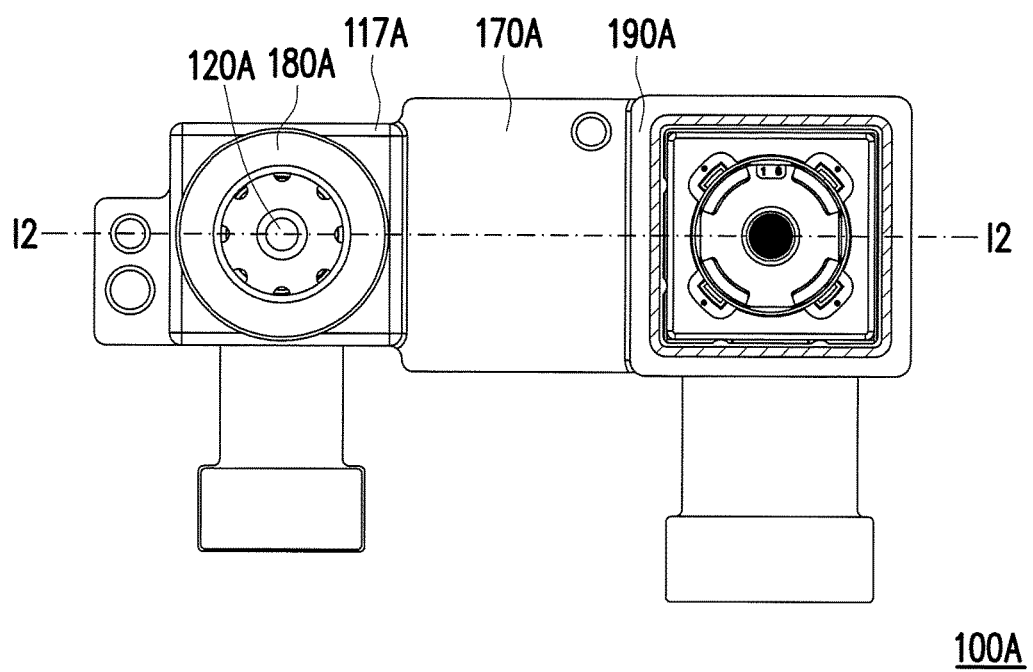
FIG. 2A is a front elevation view of an image pickup module of the second embodiment of the present invention.

FIG. 2A is a front elevation view of an image pickup module of the second embodiment of the present invention. In the second embodiment of the invention, the frame 110A further includes accommodation parts 117A, 119A and supporting part 170A connecting the accommodation part 117A and accommodation part 119A. The supporting part 170A maintains a gap d between the through holes 113, 115, so as to fulfilling more requirement with the image pickup module 100A. In other words, the frames provided by the embodiments of the invention can affix the number of the image pickup devices, and the distance between the image pickup devices can be adjusted regarding the requirement, and a custom-made affixing function can be provided with the affixing gel layers.

Please refer to FIG. 1A and FIG. 1B, in the first embodiment of the invention, the frame 100 is an integral frame 110. The frame 110 surrounds the side of the image pickup devices 120, 140, and exposing the image pickup devices 120, 140 and the affixing gel layers 130, 150. Therefore, when the image pickup devices 120, 140 are placed inside the image pickup openings 112, 114, inner edges 1121, 1141 of the image pickup openings 112, 114 and the image pickup devices 120, 140 provide a good gel-injection space therebetween, and the image pickup devices 120, 140 can be easily affixed inside the frame 110 by disposing the affixing gel layers 130, 150 in the gel-injection space, but the invention is not limit thereto.

Figure 2B:
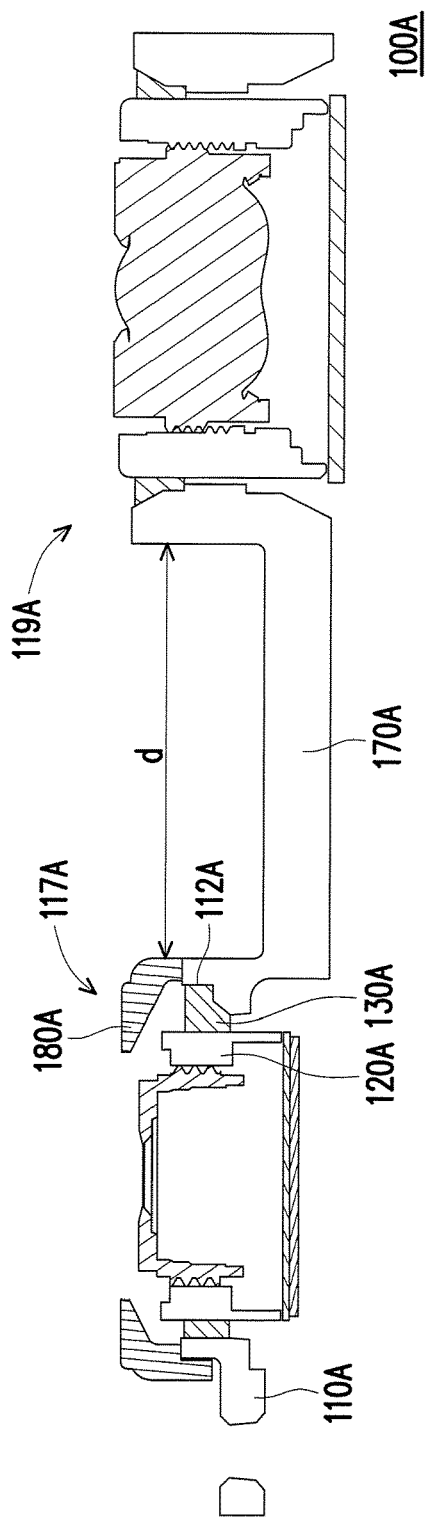
FIG. 2B is a cross-sectional view according line I2I2 in FIG. 2A.

FIG. 2B is a cross-sectional view according line 1212 in FIG. 2A. In the second embodiment of the invention, the image pickup module 100A further includes dustproof cover 180A. The dustproof cover 180A cover the image pickup opening 112A, and the dustproof cover 180A is adapted to cover the image pickup opening 112A, and the dustproof cover 180A is adapted to cover affixing gel layer 130A and the edge part of the image pickup device 120A and expose the middle part of the image pickup device 120A inside the image pickup opening 112A, so as to further provide a protection function for image pickup device 120A. In the other embodiment of the invention, the image pickup module further includes a plurality of dustproof cover for protecting the image pickup devices in all the image pickup openings.

In summary, the image pickup module of the embodiment of the invention affixes image pickup devices inside image pickup openings of a frame, and the image pickup openings preserve spaces around every image pickup devices, so as to calibrate the position and angle before affixing the image pickup devices, and the calibrated image pickup devices are affixed by affixing gel layers, so as to properly affix the image pickup devices inside the image pickup module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image pickup module comprising:
a frame comprising a plurality of image pickup opening and at least a bottom opening locating below the image pickup openings;
a plurality of image pickup device, each disposed in the frame and capturing images through each of the image pickup openings respectively, and each comprising a side surface and a circuit board which extends outwardly through the bottom opening;
a plurality of gel filling space, formed between an inner edge of each of the image pickup openings and the side surface of one of the image pickup devices; and
a plurality of affixing gel layer, each disposed in one of the gel filling spaces from a direction of an incident light, wherein each of the image pickup devices is adhered to one of the affixing gel layer, and each of the image pickup openings of the frame surrounds the side surface of each of the image pickup devices,
wherein each of the plurality of image pickup devices comprises a lens, the affixing gel layers affix an angle between an optical axis of the lens of at least one of the image pickup devices and a normal vector of a light incident surface of the frame.

2. The image pickup module according to claim 1, wherein the image pickup openings are located on the light incident surface.

3. The image pickup module according to claim 2, wherein an area of each of the image pickup openings is larger than the projection area on the light incident surface of the image pickup device inside.

4. The image pickup module according to claim 1, wherein each of the image pickup devices further comprises actuator surrounding the lens, and side surface of the actuator of each of the image pickup devices and the inner edges of the image pickup openings are adhered to each other by the affixing gel layers, and at least part of the lens and the actuator of each of the image pickup devices are exposed by one of the image pickup openings.

5. The image pickup module according to claim 1, wherein each of the image pickup openings includes a size enough for each corresponding one of the image pickup devices to pass through it.

6. The image pickup module according to claim 1, wherein the frame further comprises a plurality of lens through holes and at least one supporting part positioned between the lens through holes, and each of the lens through holes includes each of the image pickup openings and a protruding structure disposed on an inner surface of each of the lens through holes, and the supporting part maintains a gap between the lens through holes.

7. An image pickup module comprising:
a frame comprising a plurality of lens through holes, a light incident side and a connection side being corresponded to the light incident side, wherein each of lens through holes extends from the light incident side to the connection side of the frame, and forms an image pickup opening on the light incident side;
a plurality of image pickup device, each disposed in one of the lens through holes of the frame respectively and comprising a lens and a side surface surrounding the lens; and
a plurality of affixing gel layer, each disposed between an inner surface of each of the lens through holes of the frame and the side surface of each of the image pickup devices from a direction of an incident light, adopted to adhere the inner surfaces of the lens through holes of the frame to the side surfaces of the image pickup devices, wherein at least partial surface of the lens and the side surface of each image pickup devices are exposed by the image pickup openings, and the affixing gel layers affix an angle between an optical axis of the lens of at least one of the image pickup devices and a normal vector of a light incident surface of the frame.

8. The image pickup module according to claim 7, wherein the light incident surface located on the light incident side, and the image pickup openings are located on the light incident surface, and the lens through holes extend from the light incident surface.

9. The image pickup module according to claim 8, wherein the area of each of the image pickup openings is larger than the projection area on the light incident surface of the image pickup device inside.

10. The image pickup module according to claim 8, wherein a cross-sectional area, being parallel to the light incident surface, of each of the lens through holes is larger than the projection area on the light incident surface of the image pickup device inside.

11. The image pickup module according to claim 7, wherein a plurality of gel filling space is formed between the inner edge of the image pickup openings and side surface of the image pickup devices, and each of the affixing gel layers is filled in one of the gel filling spaces.

12. The image pickup module according to claim 7, wherein each of the image pickup devices further comprises an actuator accommodating the lens, and the side surface is located on the actuator, and the actuator of each of the image pickup devices is exposed by one of the image pickup openings.

13. The image pickup module according to claim 7, where each of the image pickup devices further comprises an electric circuit board, and the electric circuit board extends outwardly from the connection side of the frame.

14. The image pickup module according to claim 7, wherein each of the image pickup openings includes a size enough for each corresponding side surface of one of the image pickup devices to pass through it.

15. The image pickup module according to claim 7, wherein each of the image pickup openings surrounds the side surface of each of the image pickup devices.

16. The image pickup module according to claim 7, wherein the frame further comprises at least a supporting part positioned between the lens through holes and a protruding structure disposed on the inner surface of each of the lens through holes, and the supporting part maintains a gap between the lens through holes.

17. A manufacturing method of an image pickup module, comprising:
providing a frame, which comprises a plurality of lens through holes, a light incident side and a connection side corresponding to the light incident side, wherein each of the lens through holes extends from the light incident side to the connection side and forms an image pickup opening on the light incident side;
disposing a plurality of image pickup device in the plural of lens through holes of the frame, wherein each of the image pickup devices comprises a lens and a side surface surrounding the lens, and each of the image pickup openings exposes at least part of the lens and the side surface of the image pickup device; and
injecting a plurality of affixing gel layer through the image pickup openings from a direction of the incident light, so as to affix each of the side surface of the image pickup devices to each of the edge of the image pickup openings,
wherein the affixing gel layers affix an angle between an optical axis of the lens of at least one of the image pickup devices and a normal vector of a light incident surface of the frame.

18. The manufacturing method according to claim 17, further comprising:
rotating at least one of the image pickup devices inside the lens through holes before injecting the affixing gel layers.

19. The manufacturing method according to claim 17, further comprising:
adjusting at least one angle of optical axes of the image pickup devices before injecting the affixing gel layers.

20. The manufacturing method according to claim 17, wherein a plurality of gel filling space is formed between the edges of the image pickup openings and the side surfaces of the image pickup devices while disposing each of the image pickup devices in the frame, and then the affixing gel layers are filled in the gel filling spaces, and wherein the frame further comprises a protruding structure disposed on an inner surface of each of the lens through holes.

* * * * *